US011531860B2

United States Patent
Guo et al.

(10) Patent No.: US 11,531,860 B2
(45) Date of Patent: Dec. 20, 2022

(54) APPARATUS AND METHOD FOR EXECUTING RECURRENT NEURAL NETWORK AND LSTM COMPUTATIONS

(71) Applicant: Cambricon (Xi'an) Semiconductor Co., Ltd., Xi'an (CN)

(72) Inventors: Qi Guo, Beijing (CN); Xunyu Chen, Beijing (CN); Yunji Chen, Beijing (CN); Tianshi Chen, Beijing (CN)

(73) Assignee: CAMBRICON (XI'AN) SEMICONDUCTOR CO., LTD., Xi'an (CN)

( * ) Notice: Subject to any disclaimer, the term of this patent is extended or adjusted under 35 U.S.C. 154(b) by 1006 days.

(21) Appl. No.: 16/174,193

(22) Filed: Oct. 29, 2018

(65) Prior Publication Data

US 2019/0087709 A1    Mar. 21, 2019

Related U.S. Application Data

(63) Continuation-in-part of application No. PCT/CN2016/080744, filed on Apr. 29, 2016.

(51) Int. Cl.
*G06N 3/04*    (2006.01)
*G06N 3/06*    (2006.01)
(Continued)

(52) U.S. Cl.
CPC .............. *G06N 3/04* (2013.01); *G06F 7/501* (2013.01); *G06F 7/523* (2013.01); *G06F 9/3001* (2013.01); *G06N 3/063* (2013.01)

(58) Field of Classification Search
CPC ........ G06N 3/04; G06N 3/063; G06N 3/0445; G06N 3/0481; G06N 3/084; G06N 3/0454;
(Continued)

(56) References Cited

U.S. PATENT DOCUMENTS 7,512,723 B2 *  3/2009  Tkacik ................. G06F 13/364
                                                  710/33
8,103,803 B2 *  1/2012  Reddy ................... G06F 13/126
                                                  710/33
(Continued)

FOREIGN PATENT DOCUMENTS

CN    102947818 A    2/2013
CN    104145281 A    11/2014
(Continued)

OTHER PUBLICATIONS

A Recurrent Neural Network that Learns to Count. Paul Rodriguez, Janet Wiles & Jeffr Ey L. Elman (Year: 1999).*
(Continued)

*Primary Examiner* — Vibol Tan
(74) *Attorney, Agent, or Firm* — Getech Law LLC; Jun Ye

(57) ABSTRACT

Aspects for Long Short-Term Memory (LSTM) blocks in a recurrent neural network (RNN) are described herein. As an example, the aspects may include one or more slave computation modules, an interconnection unit, and a master computation module collectively configured to calculate an activated input gate value, an activated forget gate value, a current cell status of the current computation period, an activated output gate value, and a forward pass result.

28 Claims, 8 Drawing Sheets

(51) Int. Cl.
  G06F 7/50 (2006.01)
  G06N 3/063 (2006.01)
  G06F 7/501 (2006.01)
  G06F 9/30 (2018.01)
  G06F 7/523 (2006.01)
(58) Field of Classification Search
  CPC .... G06N 3/00; G06F 7/501; G06F 7/523; G06F 9/3001; G06F 13/28; G06F 12/023; G06F 7/544; G06F 7/5443; G06F 17/16
  See application file for complete search history.

(56) References Cited

U.S. PATENT DOCUMENTS

| | | | |
|---|---|---|---|
| 9,978,014 B2* | 5/2018 | Lupon | G06N 3/063 |
| 10,410,112 B2* | 9/2019 | Liu | G06F 9/3885 |
| 10,643,129 B2* | 5/2020 | Chen | G06N 3/0454 |
| 10,831,861 B2* | 11/2020 | Luo | G06F 9/30032 |
| 2015/0170021 A1 | 6/2015 | Lupon et al. | |

FOREIGN PATENT DOCUMENTS

| | | |
|---|---|---|
| CN | 104538028 A | 4/2015 |
| CN | 105488565 A | 4/2016 |
| CN | 105512723 A | 4/2016 |
| CN | 103970512 A | 9/2016 |
| JP | 07311754 | 11/1995 |
| WO | WO 2017/185347 A1 | 11/2017 |

OTHER PUBLICATIONS

Chapter 4—Long Short-Term Memory. A. Graves: Supervised Sequence Labell. with Recur. Neur. Networks, SCI 385, pp. 37-45. springerlink.com (Year: 2012).*
Convolutional, Long Short-Term Memory, Fully Connected Deep Neural Networks. Tara N. Sainath, Oriol Vinyals, Andrew Senior, Hasjm Sak (Year: 2015).*
A review on the long short-term memory model. Greg Van Houdt • Carlos Mosquera • Gonzalo Napoles (Year: 2020).*
EP 16899858.1—Communication from Examining Division, dated Jun. 22, 2020, 8 pages.
EP 16899858.1—Summons to Attend Oral Proceedings to Rule 115(1), dated Jun. 22, 2020, 2 pages.
EP 16899858.1—Response to Communication pursuant to Article 94(3) EPC, filed Apr. 20, 2020, 54 pages.
EP 16899858.1—NPL Copyright Statement, 1 page.
Timo Hamalainen, et al., "TUTNC: a general purpose parallel computer for neural network computations", 1995 Elsevier Science B.V., 19 pages.
Harri Klapuri, et al., "Mapping Ailincial Neural Networks to a Tree Shape Neurocomputer", Microprocessors and Microsystems, Jan. 5, 1996, 10 pages.
CN 201610285178.4—First Office Action, dated Jul. 30, 2020, 3 pages, (no English translation).
CN 201610285178.4—Second Office Action, dated Sep. 10, 2020, 16 pages, (no English translation).
CN 201610285178.4—Third Office Action, dated Dec. 21, 2020, 4 pages, (no English translation).
PCT/CN2016/080744—International Search Report, dated Feb. 6, 2017, 9 pages, (no English translation).
STM Implementation Details-PROG3.COM, "LSTM Implementation Details", Sep. 14, 2015, 8 pages, (includes translation).
Chen, et al., "DaDianNao: A Machine-Learning Supercomputer", 2014 IEEE, 14 pages.
201811279404.3—Office Action, dated Sep. 12, 2019, 13 pages, (no English translation).
T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X" An Accelerator for Sparse Neural Networks, The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.
A. Graves, "Supervised Sequence Labeling with Recurrent Neural Networks", Ph.D Dissertation, Jun. 19, 2008.
Application No. 16899858.1—European Search Report, dated Nov. 28, 2019, 5 pages.
EP16899358—Office Action, dated Dec. 17, 2019, 6 pages.

* cited by examiner

Apparatus AND METHOD FOR EXECUTING RECURRENT NEURAL NETWORK AND LSTM COMPUTATIONS

CROSS-REFERENCE TO RELATED APPLICATIONS

The present invention is a continuation-in-part of PCT Application No. PCT/CN2016/080744, filed on Apr. 29, 2016, which is incorporated herein by reference. The present application also incorporates by reference commonly owned CN application number 201610285178.4, filed on Apr. 29, 2016.

BACKGROUND

RNNs and LSTM blocks are widely applied to the fields such as pattern recognition, image processing, functional approximation and optimal computation. In recent years, due to the higher recognition accuracy and better parallelizability, RNNs have received increasing attention.

A known method to support the LSTM blocks in RNNs is to use a general-purpose processor. For example, a general-purpose register file and a general-purpose functional unit may be implemented to execute general-purpose instructions to support RNN algorithms. One of the disadvantages of the method is that the operational performance of the single general-purpose processor is lower and cannot meet the performance requirements of the operations of RNNs and LSTM blocks. When multiple general-purpose processors are executed in parallel, the communication between the general-purpose processors becomes a performance bottleneck. In addition, the general-purpose processor needs to decode the reverse operations of the RNN and the LSTM into a long list of operations and a fetch instruction sequence, and the frontend decoding of the processor brings a larger power amount of power consumption.

Another known method to support the RNN algorithms is to use graphics processing units (GPUs). Since GPUs are specially used for performing graphics image operations and scientific calculations, without special supports for multiple layer artificial neural network operations, a large amount of previous decoding work is still required to perform multiple layer artificial neural network operations, bringing a large amount of additional power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for LSTM blocks in an RNN. The example apparatus may include one or more slave computation modules configured to calculate a first input gate partial sum, a second input gate partial sum, and a third input gate partial sum. The example apparatus may further include an interconnection unit configured to add the first input gate partial sum, the second input gate partial sum, and the third input gate partial sum to generate a dormant input gate value. Further still, the example apparatus may include a master computation module connected to the one or more slave computation modules via the interconnection unit, wherein the master computation module configured to activate the dormmate input gate value to generate an activated input gate value.

Another example apparatus may include one or more slave computation modules configured to calculate a first cell output partial sum and a second cell output partial sum. In addition, the example apparatus may include an interconnection unit configured to add the first cell output partial sum and the second cell output partial sum to generate one or more cell output gradients.

Another example aspect of the present disclosure provides an example method. The example method may include calculating, by one or more slave computation modules, a first input gate partial sum, a second input gate partial sum, and a third input gate partial sum; adding, by an interconnection unit, the first input gate partial sum, the second input gate partial sum, and the third input gate partial sum to generate a dormant input gate value; and activating, by a master computation module connected to the one or more slave computation modules via the interconnection unit, the dormmate input gate value to generate an activated input gate value.

The example aspect may include another example method for LSTM blocks in an RNN. The example method may include calculating, by one or more slave computation modules, a first cell output partial sum and a second cell output partial sum; and adding, by an interconnection unit, the first cell output partial sum and the second cell output partial sum to generate one or more cell output gradients.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCIPTIOIN OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Figure 1:
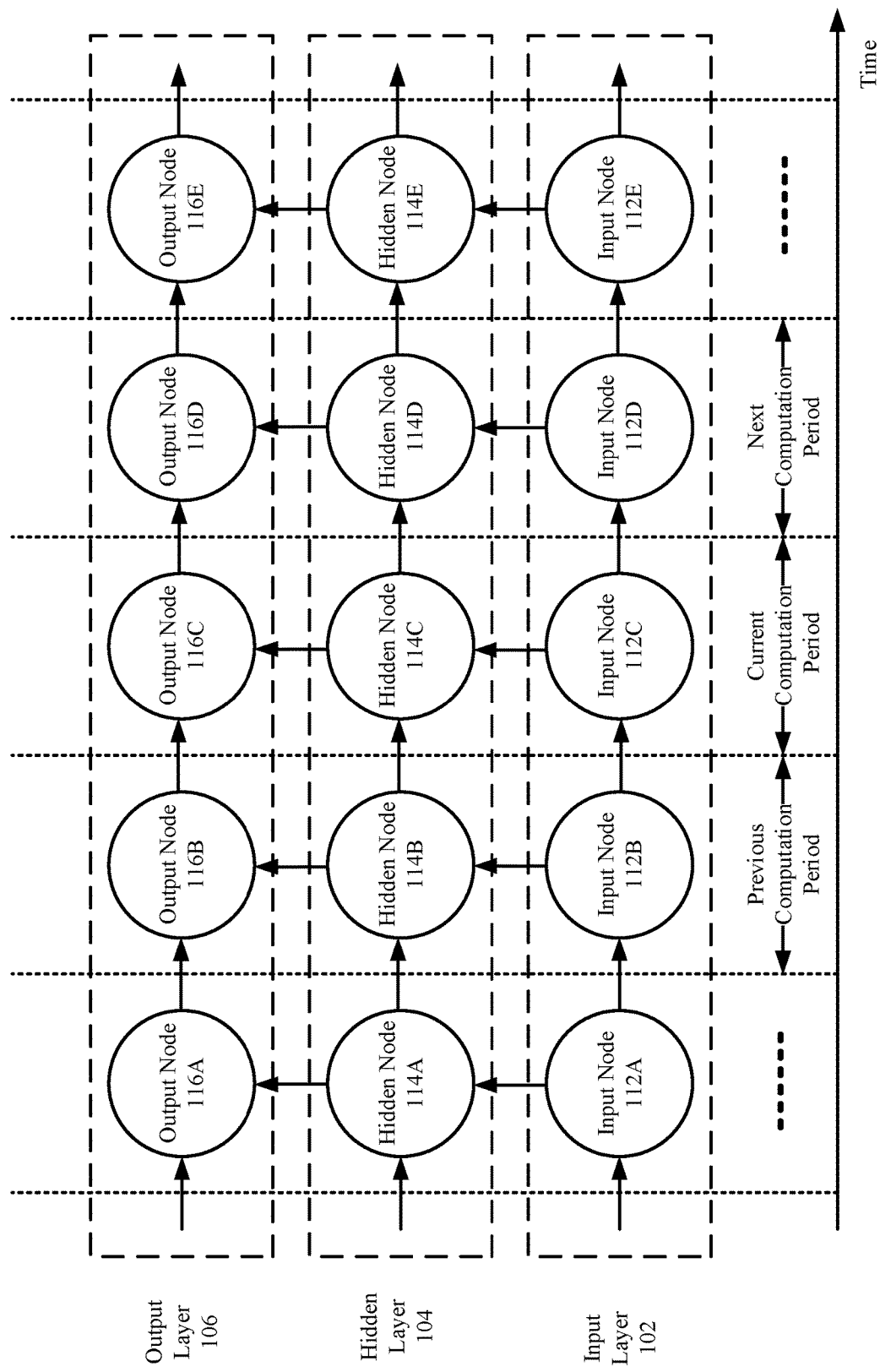
FIG. 1 illustrates a conceptional block diagram of a recurrent neural network (RNN) in which LSTM blocks may be implemented.

FIG. 1 illustrates a conceptional block diagram of a recurrent neural network (RNN) in which LSTM blocks may be implemented. Each node or circle illustrated in FIG. 1 may refer to a group of operations, rather than physical nodes.

As depicted, batches of data in a computation process of an RNN may be sequentially processed in one or more computation periods. One computation period may refer to a period of time for processing one batch of data. For example, in a current computation period, an input node 112C may transmit input data to a hidden node 114D for processing. The hidden node 114D may receive process results of a previous computation period from a hidden node 114B in a previous computation period and process the input data based on the received previous process results. Process results of the current computation period may be transmitted to an output node 118C as output. At least a portion of the process results may also transmit to a hidden node 114D for the computation in a next computation period. For example, the portion of the process results may be stored in a caching unit for future processing.

As shown in FIG. 1, one or more input nodes 112 may be grouped as an input layer 102 and one or more output nodes 116 may be grouped as an output layer 106. For illustration purpose, only one layer of hidden nodes is shown in FIG. 1; however, the structure of an RNN may not be limited to a single layer of hidden nodes. For example, multiple layers of hidden nodes may be implemented and nodes between the input layer 102 and the output layer 106 may be grouped collectively as a hidden layer 104.

Figure 2:
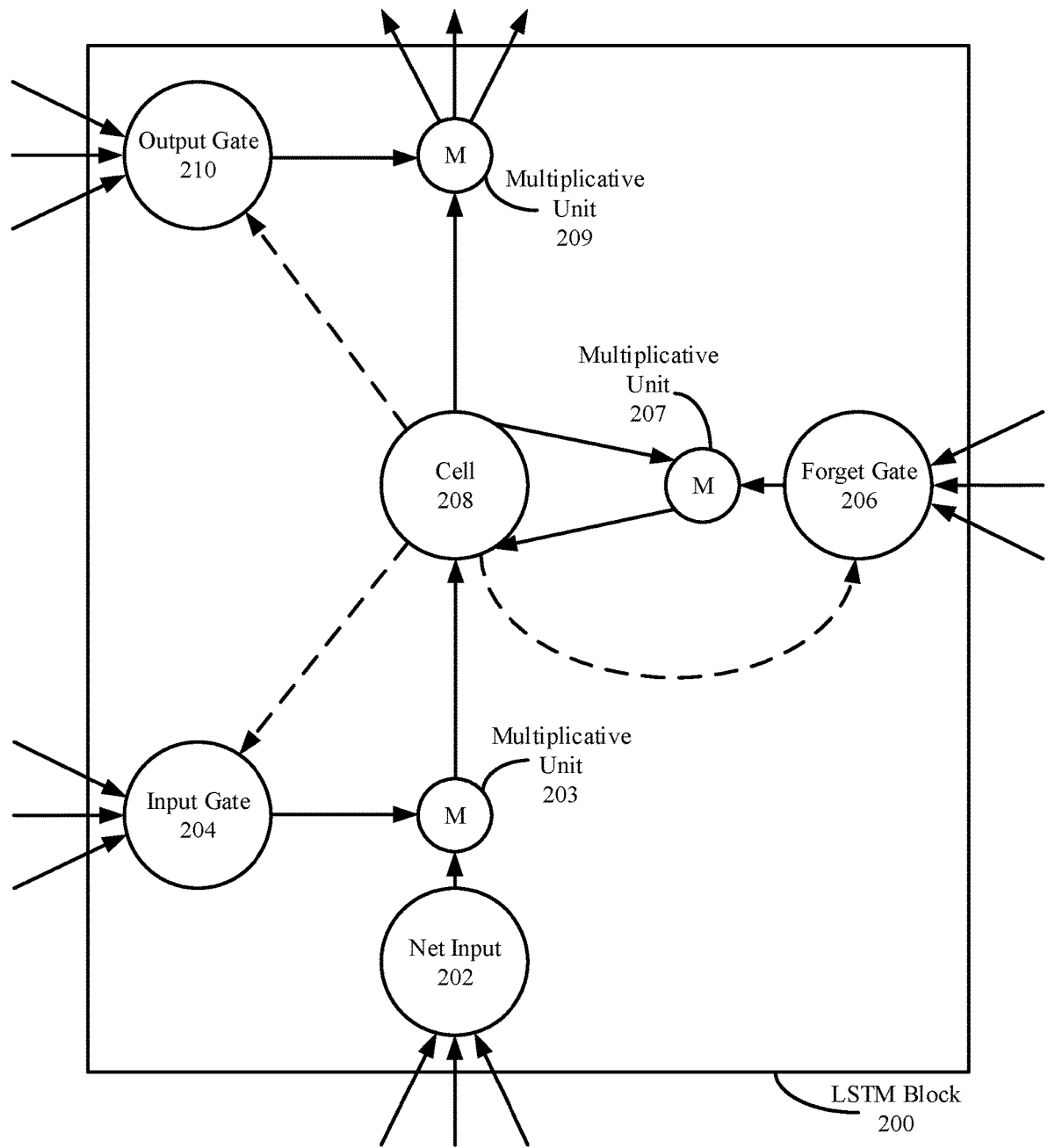
FIG. 2 illustrates a conceptional block diagram of a LSTM block that may be implemented in an RNN.

In some examples, each of the hidden nodes 114 may include one or more cell blocks as LSTM blocks that may be further described in accordance with FIG. 2.

FIG. 2 illustrates a conceptional block diagram of a LSTM block that may be implemented in an RNN.

As depicted, an LSTM block 200 may include a cell 208 and three gates including an input gate 204, a forget gate 206, an output gate 210. The cell 208 may be configured to store one or more cell status data. The input date 204, the forget gate 206, and the output gate 210 may be configured to perform one or more operations to received data. The input date 204, the forget gate 206, and the output gate 210 may further control the operations of the cell 208. In some examples, the cell status data may affect the operations of the input gate 204, the forget gate 206, and the output gate 210. For example, the cell status data of a previous computation period may be transmitted to the input gate 204, the forget gate 206, and the output gate 210. The transmission of the cell status data of the previous computation period are shown in dotted lines in FIG. 2. Further, the LSTM block 200 may include one or more multiplicative units, e.g., 203, 207, and 209, which may be respectively configured to multiply the data in the LSTM block 200.

Figure 3:
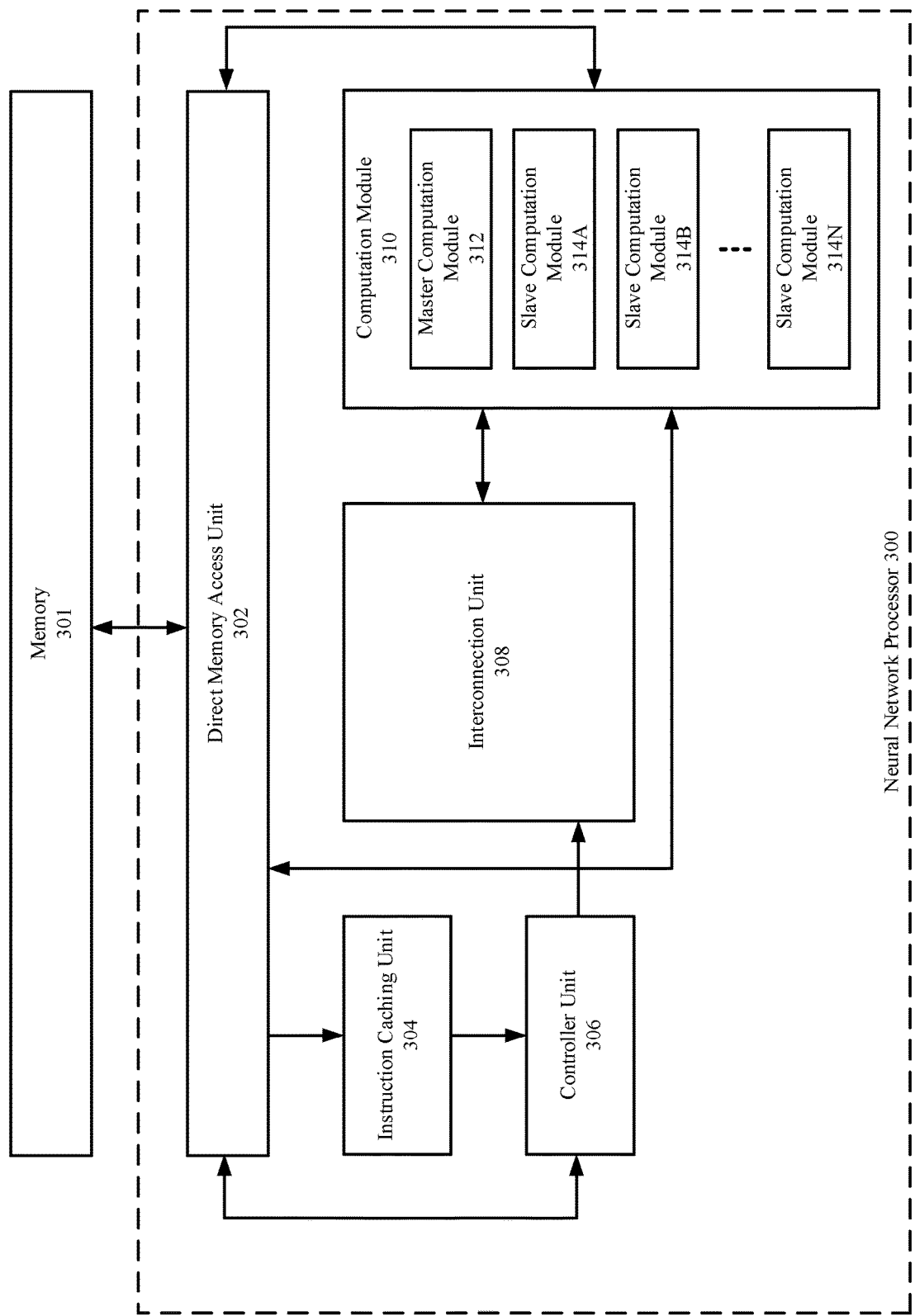
FIG. 3 illustrates a structure of an example neural network processor by which LSTM blocks in an RNN may be implemented.

The cell 208, the input gate 204, the forget gate 206, the output gate 210, and the multiplicative units may each refer to a group of operations that may be performed by the components illustrated in FIG. 3.

FIG. 3 illustrates a structure of an example neural network processor by which LSTM blocks in an RNN may be implemented. As shown in FIG. 3, the example neural network processor 300 may include an instruction caching unit 304, a controller unit 306, a direct memory access unit 302, an interconnection unit 308, a computation module 310 including a master computation module 312 and one or more slave computation modules 314 (e.g., 314A-314N). Any of the above-mentioned components or devices may be implemented by a hardware circuit (e.g., application specific integrated circuit (ASIC), Coarse-grained reconfigurable architectures (CGRAs), field-programmable gate arrays (FPGAs), analog circuits, memristor, etc.).

In some examples, the instruction caching unit 304 may be configured to receive or read instructions from the direct memory access unit 302 and cache the received instructions. The controller unit 306 may be configured to read instructions from the instruction caching unit 304 and decode one of the instructions into micro-instructions for controlling operations of other modules including the direct memory access unit 302, the master computation module 312, the slave computation modules 314, etc. In other words, the modules including the direct memory access unit 302, the master computation module 312, and the slave computation modules 314 may be configured to respectively perform the micro-instructions. The direct memory access unit 302 may be configured to access an external address range (e.g., in an external storage device such as a memory 301) and directly read or write data into respective caching units in the computation module 310.

Forward Pass

In a forward pass computation process involving the LSTM block 200 in an RNN, the interconnection unit 308, the master computation module 312, and the slave computation modules 314 may be collectively perform one or more operations to generate a forward pass result. In some example, the interconnection unit 308, the master computation module 312, and the slave computation modules 314 may be configured to sequentially calculate an activated input gate value, an activated forget gate value, a current cell status of the current computation period, an activated output gate value, and the forward pass result.

Input data received at the net input 202 may be a vector that include one or more values. A vector may refer to one or more values formatted in a one-dimensional data structure. The values included in a vector may be referred to as elements. The number of the elements in the vector may be referred to as a length of the vector. The length of the input data may be denoted as I. The output of the LSTM block 200 and the output gate 210 may be a vector of a length K. Intermediate results between LSTM blocks (e.g., from hidden node 114B to hidden node 114C) may be vectors of a length H. A cell status vector of cell 208 may a vector of a length C.

The slave computation modules 314 may be configured to calculate a first input gate partial sum, a second input gate partial sum, and a third input gate partial sum. In more detail, the slave computation modules 314 may be configured to multiply a first portion of a first stored weight vector with one or more input data to generate the first input gate partial sum. The second input gate partial sum may be calculated by the slave computation modules 314 by multiplying a second portion of a first store weight vector with one or more hidden layer input data of a previous computation period to generate the second input gate partial sum. Further, the slave computation modules 314 may be configured to multiply a third portion of a first stored weight vector with a cell status vector of a previous computation period to generate the third input gate partial sum.

The first input gate partial sum, the second input gate partial sum, and the third input gate partial sum may be transmitted by the slave computation modules 314 to the interconnection unit 308 and further be added by the interconnection unit 308 to generate a dormant input gate value. For example, the dormant input gate value of the current computation period may be represented as $a_l^t = \Sigma_{i=1}^{I} w_{il} x_i^t + \Sigma_{h=1}^{H} w_{hl} b_h^{t-1} + \Sigma_{c=1}^{C} w_{cl} s_c^{t-1}$, in which $\Sigma_{i=1}^{I} w_{il} x_i^t$ represents the first input gate partial sum, $\Sigma_{h=1}^{H} w_{hl} b_h^{t-1}$ represents the second input gate partial sum, $\Sigma_{c=1}^{C} w_{cl} s_c^{t-1}$ represents the third input gate partial sum, l represents an index in a vector of a length I, $x_i^t$ represents the input data received at the net input 202 in the current computation period, $b_h^{t-1}$ represents one or more hidden layer input data of the previous computation period (e.g., from hidden node 114B to hidden layer 114C), and $s_c^{t-1}$ represents the cell status vector of the previous computation period. In some examples, each of the slave computation modules 314 may be configured to store a weight vector and $w_{il}$, $w_{hl}$, and $w_{cl}$ may respectively refer to different portions of the stored weight vector.

The dormant input gate value $a_l^t$ may then be transmitted from the interconnection unit 308 to the master computation module 312. The master computation module 312 may be configured to activate the dormant input gate value $a_l^t$ to generate the activated input gate value. The activated input gate value may be represented as $b_l^t = f(a_l^t)$, in which $f(\ )$ may refer to an activation function stored in the master computation module 312. The activation function may be one of sigmoid, relu, softmax, or tanh function.

Further, the slave computation modules 314 may be configured to calculate a first forget gate partial sum, a second forget gate partial sum, and a third forget gate partial sum. In more detail, the slave computation modules 314 may be configured to multiply a first portion of a second stored weight vector with one or more input data to generate the first forget gate partial sum. Further, the slave computation modules 314 may be configured to multiply a second portion of a second stored weight vector with one or more hidden layer input data of a previous computation period to generate the second forget gate partial sum. In addition, the slave computation modules 314 may be configured to multiply a third portion of a second stored weight vector with a cell status vector of a previous computation period to generate the third forget gate partial sum.

The first forget gate partial sum, the second forget gate partial sum, and the third forget gate partial sum may be similarly transmitted to the interconnection unit 308 and added by the interconnection unit 308 into a dormant forget gate value of the current computation period. For example, the dormant forget gate value may be represented as $a_\emptyset^t = \Sigma_{i=1}^{I} w_{i\emptyset} x_i^t + \Sigma_{h=1}^{H} w_{h\emptyset} b_h^{t-1} + \Sigma_{c=1}^{C} w_{c\emptyset} s_c^{t-1}$, in which $\Sigma_{i=1}^{I} w_{i\emptyset} x_i^t$ represent the first forget gate partial sum, $\Sigma_{h=1}^{H} w_{h\emptyset} b_h^{t-1}$ represents the second forget gate partial sum, $\Sigma_{c=1}^{C} w_{c\emptyset} s_c^{t-1}$ represents the third forget gate partial sum, $w_{i\emptyset}$, $w_{h\emptyset}$, $w_{c\emptyset}$ respectively refers to different portions of the stored weight vector, Ø refers to another index in a vector of a length I. Similarly, $x_i^t$, represents the input data received at the net input 202 in the current computation period, $b_h^{t-1}$ represents one or more hidden layer input data of the previous computation period (e.g., from hidden node 114B to hidden layer 114C), and $s_c^{t-1}$ represents the cell status vector of the previous computation period.

The dormant forget gate value may be transmitted by the interconnection unit 308 to the master computation module 312. The master computation module 312 may be configured to activate the dormant forget gate value with an activation function to generate an activated forget gate value that may be represented as $b_\emptyset^t = f(a_\emptyset^t)$, in which $f(\ )$ may refer to an activation function stored in the master computation module 312. The activation function may be different from the activation function applied in generate the activated input gate value.

Further still, the slave computation modules 114 may be configured to calculate a first cell status partial sum and a second cell status partial sum. In more detail, the slave computation modules 114 may be configured to multiply a first portion of a third stored weight vector with one or more input data to generate the first cell status partial sum. In addition, the slave computation modules 114 may be configured to multiply a second portion of a third stored weight vector with one or more hidden layer input data of a previous computation period to generate the second cell status partial sum.

The first cell status partial sum and the second cell status partial sum may be transmitted to the interconnection unit 308 and added by the interconnection unit 308 to generate a cell input of the current computation period. For example, the cell input of a current computation period may be represented as $a_c^t = \Sigma_{i=1}^{I} w_{ic} x_i^t + \Sigma_{h=1}^{H} w_{hc} b_h^{t-1}$, in which $\Sigma_{i=1}^{I} w_{ic} x_i^t$ represents the first cell status partial sum and $\Sigma_{h=1}^{H} w_{hc} b_h^{t-1}$ represents the second cell status partial sum. Similarly, $w_{ic}$ and $w_{hc}$ may respectively refer to different portions of the stored weight vector. $x_i^t$ represents the input data received at the net input 202 in the current computation period, $b_h^{t-1}$ represents one or more hidden layer input data of the previous computation period.

The cell input of the current computation period may be transmitted to the master computation module 312. The master computation module 312 may be configured to generate a current cell status of the current computation period based on the activated forget gate value, the activated input gate value, and the cell input of the current computation period. For example, the current cell status may be represented as $s_c^t = b_\emptyset^t s_c^{t-1} + b_l^t g(a_c^t)$, in which $b_\emptyset^t$ represents the activated forget gate value, $s_c^{t-1}$ represents the cell status vector of the previous computation period, $b_i^t$ represents the activated input gate value, $g(a_c^t)$ represents an activated cell input. The activated cell input may be generated by the master computation module 312 by applying an activation function to the cell input. The activation function may be different from the activation function applied in generate the activated input gate value.

Further still, the slave computation modules 314 may be configured to calculate a first output gate partial sum, a second output gate partial sum, and a third output gate partial sum. In more detail, the slave computation modules 314 may be configured to multiply a portion of the weight vector with the input data received at the net input 202 to generate the first output gate partial sum. Further, the slave computation modules 314 may be configured to multiply another portion of the weight vector with the one or more hidden layer input data of the previous computation period. Further still, the slave computation modules 314 may be configured to multiply yet another portion of the weight vector with the current cell status.

The first output gate partial sum, the second output gate partial sum, and the third output gate partial sum may be transmitted to the interconnection unit 108 and added by the interconnection unit 108 to generate a dormant output gate value. For example, the dormant output gate value may be represented as $a_\omega^t = \Sigma_{i=1}^I w_{i\omega} x_i^t + \Sigma_{h=1}^H w_{h\omega} b_h^{t-1} + \Sigma_{c=1}^C w_{c\omega} s_c^t$, in which $\Sigma_{i=1}^I w_{i\omega} x_i^t$ represents the first output gate partial sum and $\Sigma_{h=1}^H w_{h\omega} b_h^{t-1}$ represents the second output gate partial sum, $\Sigma_{c=1}^C w_{c\omega} s_c^t$ represents the third output gate partial sum. Similarly, $w_{i\omega}$, $w_{hd\,\omega}$, and $w_{c\omega}$ may respectively refer to different portions of the stored weight vector; $x_i^t$ represents the input data received at the net input 202 in the current computation period, $b_{h-1}^t$ represents one or more hidden layer input data of the previous computation period.

The dormant output gate value may be transmitted to the master computation module 312. The master computation module 312 may be configured to activate the dormant output gate value to generate an activated output gate value. The activated output gate value may be represented as $b_\omega^t = f(a_\omega^t)$, in which $f(\ )$ may refer to an activation function stored in the master computation module 312. The activation function may be different from the activation function applied in generate the activated input gate value.

Further, master computation module 312 may be configured to activate the current cell status of the current computation period to generate an activated current cell status and multiply the activated current cell status with the activated output gate value to generate a forward pass result. For example, the forward pass result may be represented as $b_c^t = b_\omega^t h(s_c^t)$, in which $b_\omega^t$ represents the activated output gate value and $h(s_c^t)$ represents the activated current cell status.

Backward Pass

In a backward pass computation process involving the LSTM block 200 in an RNN, the interconnection unit 308, the master computation module 312, and the slave computation modules 314 may be collectively perform one or more operations to generate multiple data gradients. For example, the interconnection unit 308, the master computation module 312, and the slave computation modules 314 may be configured calculate one or more cell output gradients, one or more output gate gradients, one or more cell status gradients, one or more cell input gradients, one or more forget gate gradients, and one or more input gate gradients.

In generating the data gradients, the process results in all the computation periods of the forward pass may be respectively stored in caching units in the master computation module 312 and the slave computation module 314. A next computation period may refer to a computation period that follows the current computation period in the forward pass, rather than a future time period.

In calculating the cell output gradients, the slave computation modules 314 may be configured to calculate a first cell output partial sum and a second cell output partial sum. In more detail, the slave computation modules 314 may be configured to multiply a portion of the stored weight vector with an output difference of the current computation period to generate the first cell output partial sum. The output difference of the current computation period may refer to a difference between the forward pass result and an estimated forward pass result. Further, the slave computation modules 314 may be configured to multiply another portion of the stored weight vector with an output difference of a next computation period. The first cell output partial sum and the second cell output partial sum may be transmitted to the interconnection unit 308 and added by the interconnection 308 into the cell output gradients. For example, the cell output gradients may be represented as $\in_c^t = \Sigma_{k=1}^K w_{ck} \delta_k^t + \Sigma_{g=1}^G w_{cg} \delta_g^{t+1}$, in which $\Sigma_{k=1}^K w_{ck} \delta_k^t$ represents the first cell output partial sum, $\Sigma_{g=1}^G = w_{cg} \delta_g^{t+1}$ represents the second cell output partial sum, $w_{ck}$ and $w_{cg}$ respectively represents different portions of the stored weight vector, $\delta_k^t$ represents the output difference of the current computation period, and $\delta_g^{t+1}$ represents the output difference of the next computation period.

In calculating the output gate gradients, the slave computation modules 314 may be configured to multiply the cell output gradients with activated current cell status to generate a cell output multiplication result. The master computation module 312 may be configured to activate a dormant output gate value with a derivative of an activation function to generate an activated output gate value and, further, multiply the activated output gate value with the cell output multiplication result to generate the output gate gradients. For example, the output gate gradients may be represented as $\delta_\omega^t = f'(a_\omega^t) \Sigma_{c=1}^C h(s_c^t) \in_c^t$, in which $\in_c^t$ represents the cell output gradients, $h(s_c^t)$ represents the activated current cell status, $f'(a_\omega^t)$ represents the activated output gate value, and $f'(\ )$ represents the derivative of an activation function.

In calculating the cell status gradients, the slave computation modules 314 may be configured to calculate a first cell status partial sum, a second cell status partial sum, a third cell status partial sum, a fourth cell status partial sum, and a fifth cell status partial sum. The first cell status partial sum, the second cell status partial sum, the third cell status partial sum, the fourth cell status partial sum, and the fifth cell status partial sum may be transmitted to the interconnection unit 308 and added by the interconnection unit 308 into one or more cell status gradients. For example, the cell status gradients may be represented as $\in_s^t = b_\omega^t h'(s_c^t) \in_c^t + b_\emptyset^{t+1} \in_s^{t+1} + w_{cl} \delta_l^{t+1} + w_{c\emptyset} \delta_\emptyset^{t+1} + w_{c\omega} \delta_\omega^{t+1}$, in which $b_\omega^t$ represents the activated output gate value, $h'(s_c^t)$ represents current cell status activated by a derivative of the activation function, $\in_c^t$ represents the cell output gradients, $b_\emptyset^{t+1}$ represents an activated forget gate value of a next computation period, $\in_s^{t+1}$ represents cell status gradients of the next computation period, $w_{cl}$, $w_{c\emptyset}$, and $w_{c\omega}$ respectively represents different portions of the stored weight vector, $\delta_l^{t+1}$ represents input gate gradients of the next computation period, $\delta_\emptyset^{t+1}$ represents the forget gate gradients of the next computation period, and $\delta_\omega^{t+1}$ represents the output gate gradients of the next computation period.

In calculating the cell input gradients, the master computation module 312 may be configured to activate a cell input of a current computation period to generate one or more activated cell input and multiply an activated input gate value, the activated cell input, with the cell status gradients to generate one or more cell input gradients. For example, the cell input gradients may be represented as $\delta_c^t = b_i^t g'(a_c^t) \in_s^t$, in which $b_i^t$ represents the activated input gate value of the current computation period, $g'(a_c^t)$ represents the cell input activated by the derivative of the activation function, and $\in_s^t$ represents the cell status gradients.

In calculating the forget gate gradients, the slave computation modules 314 may be configured to multiply the cell status gradients with a previous cell status of a previous computation period to generate a forget gate multiplication result. The master computation module 312 may be configured to activate a dormant forget gate value to generate an activated forget gate value and multiply the activated forget gate value with the forget gate multiplication result to generate one or more forget gate gradients. For example, the forget gate gradients may be represented as $\delta_\varnothing^t = f'(a_\varnothing^t) \Sigma_{c=1}^C s_c^{t-1} \in_s^t$, in which $f'(a_\varnothing^t)$ represents a dormant forget gate value activated by the derivative of the activation function, $s_c^{t-1}$ represents the cell status vector of the previous computation period, and $\in_s^t$ represents the cell status gradients.

In calculating the input gate gradients, the master computation module 312 may be configured to activate a current cell status of the current computation period to generate an activated current cell status and activate the dormant input gate value to generate an activated input gate value. The slave computation modules 314 may be configured to multiply the activated current cell status with the one or more cell status gradients to generate an input gate multiplication result. The master computation module 312 may be further configured to multiply the activated input gate value with the input gate multiplication result to generate one or more input gate gradients. For example, the input gate gradients may be represented as $\delta_i^t = f'(a_i^t) \Sigma_{c=1}^C g(s_c^t) \in_s^t$, in which $f'(a_i^t)$ represents a dormant input gate value activated by the derivative of the activation function, $g(s_c^t)$ represents the activated current cell status, and $\in_s^t$ represents the cell status gradients.

Figure 4:
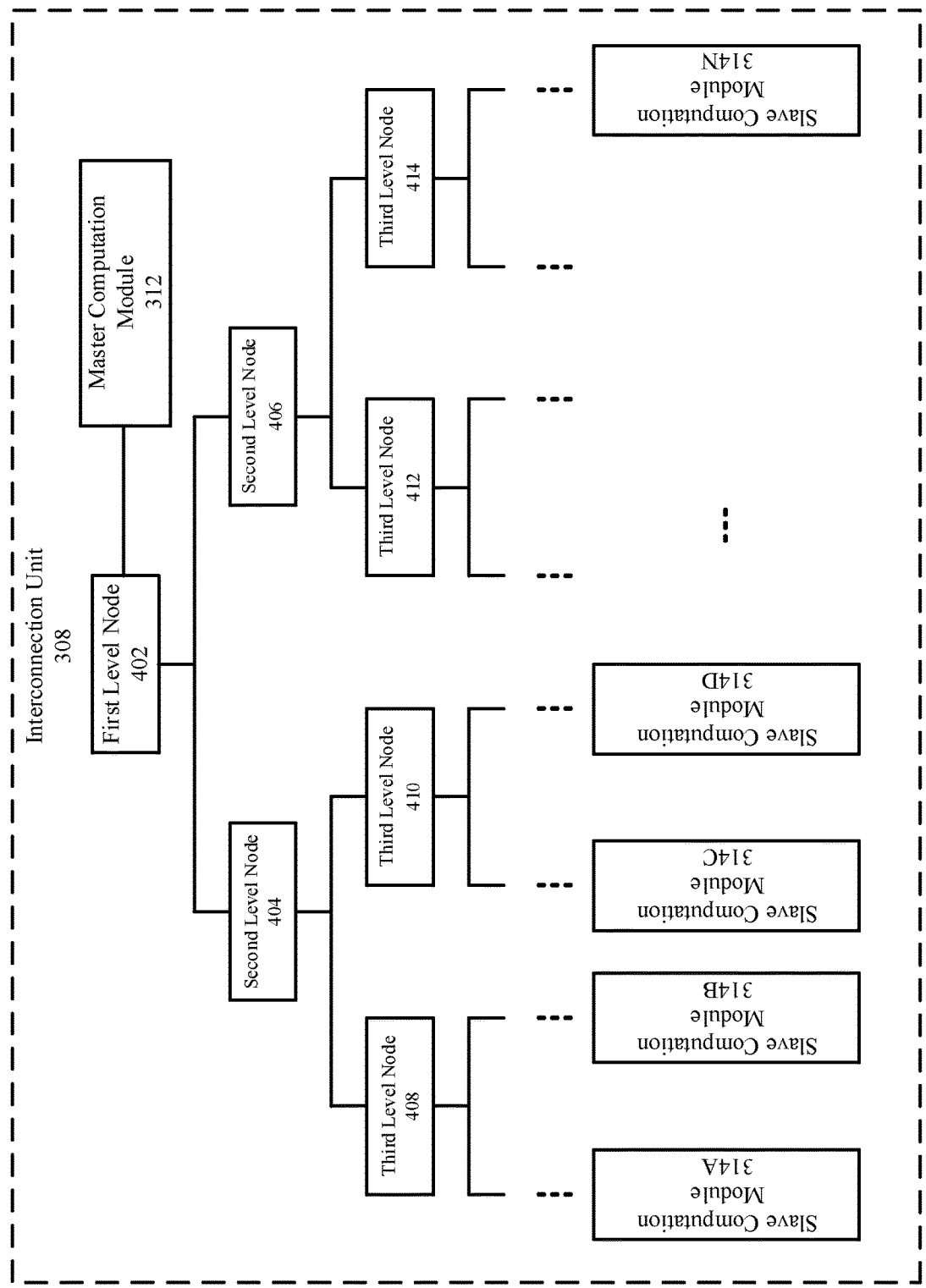
FIG. 4 illustrates a structure of an example interconnection unit in the neural network processor by which LSTM blocks in an RNN may be implemented.

FIG. 4 illustrates a structure of an example interconnection unit in the neural network processor by which LSTM blocks in an RNN may be implemented.

As depicted, the interconnection unit 308 may be structured as a binary tree that includes multiple levels (e.g., from top level to lower levels). Each level may include one or more nodes. Each node may be configured to send data to two nodes at a lower level. Further, each node may combine or add data received from two nodes at a lower level. The combined data may be transmitted to a node at a higher level. For example, the received data (e.g., a and b) from the two nodes at the lower level may be combined into a 2-dimensional vector (e.g., (a, b)) by the node at this level. The combined data, i.e., the 2-dimensional vector may be transmitted to a node at a higher level and further combined into a 4-dimensional vector. Alternatively, or additionally, each node may be configured to add data received from the two nodes at the lower level and the sum of the addition may be sent to the node at the high level.

As shown in FIG. 4, the nodes of the binary tree at the lowest levels may be connected to the slave computation modules 314. The data output from the slave computation modules 314 may be combined or summed at the multiple levels to generate a value or a vector at the first level node 402. The generated value or vector may be transmitted to the master computation module 312.

Figure 5:
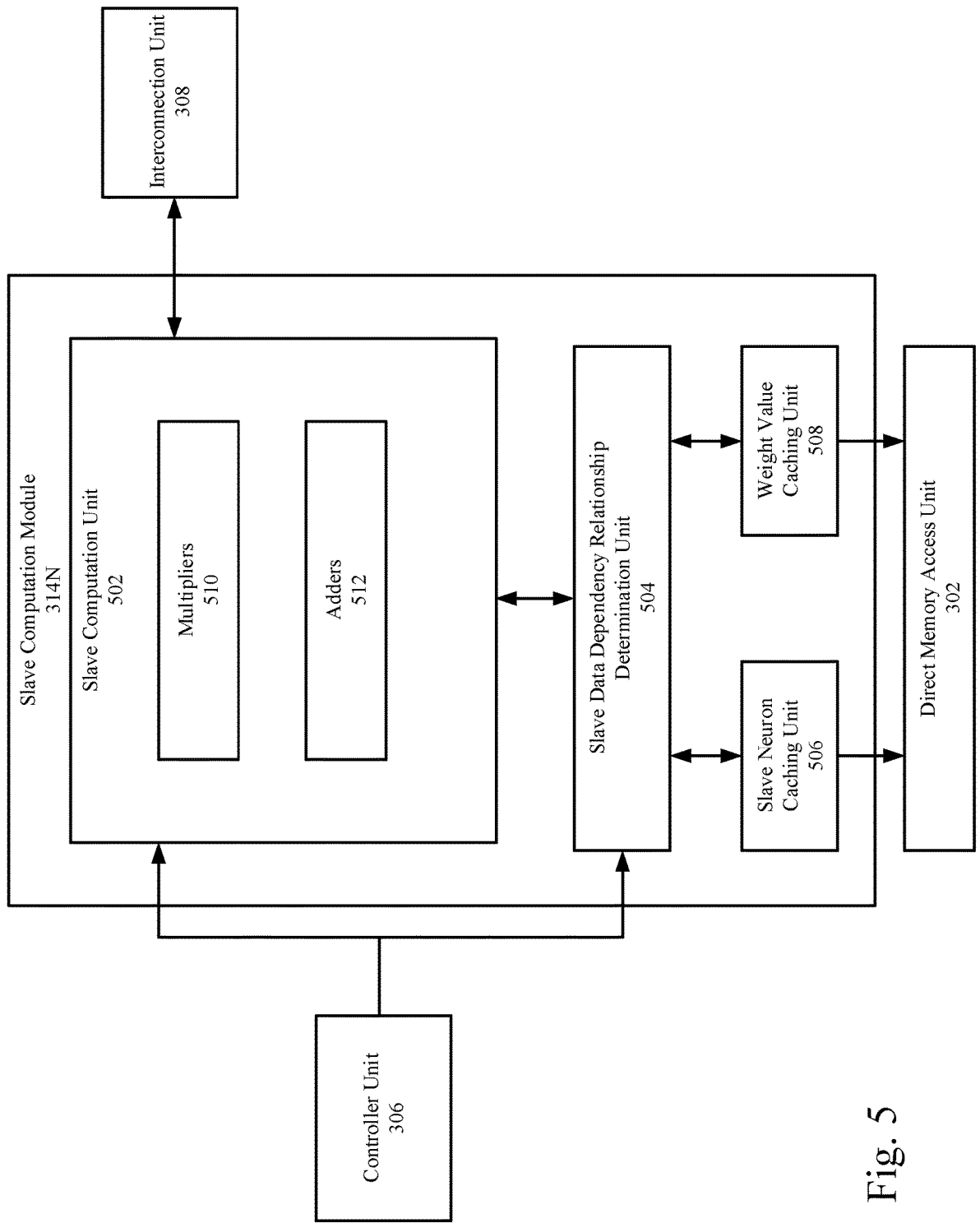
FIG. 5 illustrates a block diagram of an example slave computation module by which LSTM blocks in an RNN may be implemented.

FIG. 5 illustrates a block diagram of an example slave computation module by which LSTM blocks in an RNN may be implemented.

As shown in FIG. 5, the slave computation module 314N comprises a slave computation unit 502, a slave data dependency relationship determination unit 504, a slave neuron caching unit 506, and a weight value caching unit 508. Hereinafter, a caching unit (e.g., a master neuron caching unit 606, the slave neuron caching unit 506, the weight value caching unit 508, etc.) may refer to an on-chip caching unit integrated in the neural network acceleration processor 300, rather than other storage devices in memory 301 or other external devices. In some examples, the on-chip caching unit may be implemented as an on-chip buffer, an on-chip Static Random Access Memory (SRAM), or other types of on-chip storage devices that may provide higher access speed than the external memory.

The slave data dependency relationship determination unit 504 may be configured to perform data access operations (e.g., reading or writing operations) on the caching units including the slave neuron caching unit 506 and the weight value caching unit 508 during the computation process. The slave data dependency relationship determination unit 504 may be configured to prevent conflicts in reading and writing of the data in the caching units including the slave neuron caching unit 506 and the weight value caching unit 508. For example, the slave data dependency relationship determination unit 504 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the slave data dependency relationship determination unit 504 may be stored in an instruction queue within the slave data dependency relationship determination unit 504.The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The slave neuron caching unit 506 may be configured to store intermediate results during the process of the slave computation unit 502. The intermediate results may include multiplication results generated in a multiplication between two vectors. The weight value caching unit 508 may be configured to store at least one weight vector of a weight matrix.

The slave computation unit 502 may further include one or more multipliers 510 and one or more adders 512. With respect to a multiplication between two vectors, the multipliers 510 may be respectively configured to multiply elements of a first vector with elements of a second vector. The multiplication results generated by the multipliers 510 may be added by the adders 512 to generate a vector multiplication result. Thus, adders 512 may be configured to perform at least a part of the multiplication between two vectors.

In calculating the activated input gate value during the forward pass computation process, the slave computation modules 314 may be configured to calculate the first input gate partial sum, the second input gate partial sum, and the third input gate partial sum. In more detail, the multipliers 510 and the adders 512 may be configured to multiply a first portion of a first stored weight vector with one or more input data to generate the first input gate partial sum. The second input gate partial sum may be calculated by the multipliers 510 and the adders 512 by multiplying a second portion of a first store weight vector with one or more hidden layer input data of a previous computation period to generate the second input gate partial sum. Further, the multipliers 510 and the adders 512 may be configured to multiply a third portion of a first stored weight vector with a cell status vector of a previous computation period to generate the third input gate partial sum.

In calculating the activated forget gate value, the slave computation modules 314 may be configured to calculate a first forget gate partial sum, a second forget gate partial sum, and a third forget gate partial sum. In more detail, the multipliers 510 and the adders 512 may be configured to multiply a first portion of a second stored weight vector with one or more input data to generate the first forget gate partial sum. Further, the multipliers 510 and the adders 512 may be configured to multiply a second portion of a second stored weight vector with one or more hidden layer input data of a previous computation period to generate the second forget gate partial sum. In addition, the multipliers 510 and the adders 512 may be configured to multiply a third portion of a second stored weight vector with a cell status vector of a previous computation period to generate the third forget gate partial sum.

In calculating the cell input of the current computation period, the slave computation modules 114 may be configured to calculate a first cell status partial sum and a second cell status partial sum. In more detail, the multipliers 510 and the adders 512 may be configured to multiply a first portion of a third stored weight vector with one or more input data to generate the first cell status partial sum. In addition, the multipliers 510 and the adders 512 may be configured to multiply a second portion of a third stored weight vector with one or more hidden layer input data of a previous computation period to generate the second cell status partial sum.

In calculating the activated output gate value, the slave computation modules 314 may be configured to calculate a first output gate partial sum, a second output gate partial sum, and a third output gate partial sum. In more detail, the multipliers 510 and the adders 512 may be configured to multiply a portion of the weight vector with the input data received at the net input 202 to generate the first output gate partial sum. Further, the multipliers 510 and the adders 512 may be configured to multiply another portion of the weight vector with the one or more hidden layer input data of the previous computation period. Further still, the multipliers 510 and the adders 512 may be configured to multiply yet another portion of the weight vector with the current cell status.

In calculating the cell output gradients, the slave computation modules 314 may be configured to calculate a first cell output partial sum and a second cell output partial sum. In more detail, the multipliers 510 and the adders 512 may be configured to multiply a portion of the stored weight vector with an output difference of the current computation period to generate the first cell output partial sum. Further, the multipliers 510 and the adders 512 may be configured to multiply another portion of the stored weight vector with an output difference of a next computation period.

In calculating the output gate gradients, the multipliers 510 and the adders 512 may be configured to multiply the cell output gradients with activated current cell status to generate a cell output multiplication result.

In calculating the cell status gradients, the multipliers 510 and the adders 512 may be configured to calculate a first cell status partial sum, a second cell status partial sum, a third cell status partial sum, a fourth cell status partial sum, and a fifth cell status partial sum. The first cell status partial sum, the second cell status partial sum, the third cell status partial sum, the fourth cell status partial sum, and the fifth cell status partial sum may be respectively represented as $b_\omega{}'h'(s_c{}^t) \in_c{}^t$, $b_\varnothing{}^{t+1} \in_s{}^{t+1}$, $w_{cI}\delta_I{}^{t+1}$, $w_{c\varnothing}\delta_\varnothing{}^{t+1}$, and $w_{c\omega}\delta_\omega{}^{t+1}$, in which $b_w{}^t$ represents the activated output gate value, $h'(s_c{}^t)$ represents current cell status activated by a derivative of the activation function, $\in_c{}^t$ represents the cell output gradients, $b_\varnothing{}^{t+1}$ represents an activated forget gate value of a next computation period, $\in_s{}^{t+1}$ represents cell status gradients of the next computation period, $w_{cI}$, $w_{c\varnothing}$, and $w_{c\omega}$ respectively represents different portions of the stored weight vector, $\delta_I{}^{t+1}$ represents input gate gradients of the next computation period, $\delta_\varnothing{}^{t+1}$ represents the forget gate gradients of the next computation period, and $\delta_\omega{}^{t+1}$ represents the output gate gradients of the next computation period.

In calculating the forget gate gradients, the multipliers 510 and the adders 512 may be configured to multiply the cell status gradients with a previous cell status of a previous computation period to generate a forget gate multiplication result.

In calculating the input gate gradients, the multipliers 510 and the adders 512 may be configured to multiply the activated current cell status with the one or more cell status gradients to generate an input gate multiplication result.

Figure 6:
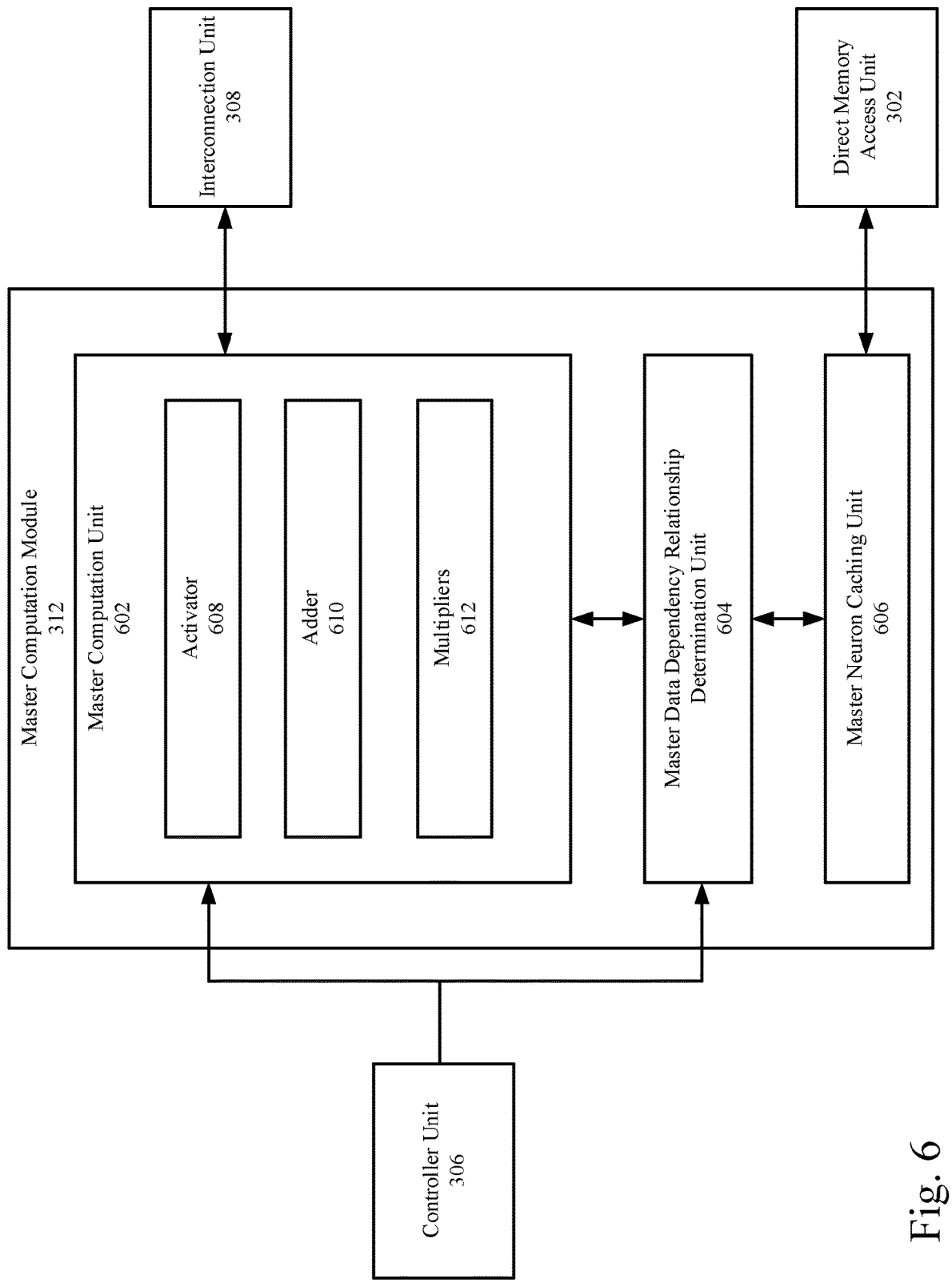
FIG. 6 illustrates a block diagram of an example master computation module by which LSTM blocks in an RNN may be implemented.

FIG. 6 illustrates a block diagram of an example master computation module by which LSTM blocks in an RNN may be implemented.

As shown in FIG. 6, the master computation module 312 may include a master computation unit 602, a master data dependency relationship determination unit 604, and a master neuron caching unit 606.

Similar to the slave data dependency relationship determination unit 504, the master data dependency relationship determination unit 604 may be configured to perform data access operations (e.g., reading or writing operations) on the caching units including the master neuron caching unit 606 during the computation process. The master data dependency relationship determination unit 604 may be configured to prevent conflicts in reading and writing of the data in the caching units including the master neuron caching unit 606. For example, the master data dependency relationship determination unit 604 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the master data dependency relationship determination unit 604 may be stored in an instruction queue within the master data dependency relationship determination unit 604. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The master neuron caching unit 606 may be configured to store the data related to the forward pass and the backward pass computation process, e.g., an activation function and a derivative of the activation function.

The master computation unit 602 may further include an activator 608, an adder 610, and one or more multipliers 612.

In calculating the activated input gate value, the master computation module 312 may be configured to activate the dormant input gate value af to generate the activated input gate value. For example, the activator 608 may be configured to activate the dormant input gate value af to generate the activated input gate value. The activated input gate value may be represented as $b_I^t=f(a_I^t)$, in which $f(\ )$ may refer to an activation function stored in the master neuron caching unit 606.

In calculating the activated forget gate value, the activator 608 may be configured to activate the dormant forget gate value with an activation function to generate an activated forget gate value that may be represented as $b_\varnothing^t=f(a_\varnothing^t)$, in which $f(\ )$ may refer to an activation function stored in the master neuron caching unit 606.

In calculating the current cell status of the current computation period, the master computation module 312 may be configured to generate a current cell status of the current computation period based on the activated forget gate value, the activated input gate value, and the cell input of the current computation period. For example, the current cell status may be represented as $s_c^t=b_\varnothing^t s_c^{t-1}+b_I^t g(a_c^t)$ in which $b_\varnothing^t$ represents the activated forget gate value, $s_c^{t-1}$ represents the cell status vector of the previous computation period, $b_I^t$ represents the activated input gate value, $g(a_c^t)$ represents activated cell input. The activator 608 may be configured to activate the cell input. The multipliers 612 may be configured to multiply the activated forget gate value and the cell status vector of the previous computation period and to multiply the activated input gate value with the activated cell input. Th adder 610 may be configured to add the multiplication results. In some other examples, the activated forget gate value, the activated input gate value, and the cell input of the current computation period may be transmitted back to the slave computation modules 314 to generate the current cell status.

In calculating the activated output gate value, the activator 608 may be configured to activate the dormant output gate value to generate an activated output gate value. The activated output gate value may be represented as $b_\omega^t=f(a_\omega^t)$, in which $f(\ )$ may refer to an activation function stored in the master neuron caching unit 606. Further, the activator 608 may be configured to activate the current cell status of the current computation period to generate an activated current cell status. The multipliers 612 may be configured to multiply the activated current cell status with the activated output gate value to generate a forward pass result. For example, the forward pass result may be represented as $b_c^t=b_\omega^t h(s_c^t)$, in which $b_\omega^t$ represents the activated output gate value and $h(s_c^t)$ represents the activated current cell status.

In calculating the output gate gradients, the activator 608 may be configured to activate a dormant output gate value with a derivative of an activation function to generate an activated output gate value. The multipliers 612 may be configured to multiply the activated output gate value with the cell output multiplication result to generate the output gate gradients. For example, the output gate gradients may be represented as $\delta_\omega^t=f'(a_\omega^t)\Sigma_{c=1}^{C}h(s_c^t)\in_c^t$ in which $\in_c^t$ represents the cell output gradients, $h(s_c^t)$ represents the activated current cell status, $f'(a_\omega^t)$ represents the activated output gate value, and $f'(\ )$ represents the derivative of an activation function.

In calculating the cell input gradients, the activator 608 may be configured to activate a cell input of a current computation period to generate one or more activated cell input. The multipliers 612 may be configured to multiply an activated input gate value, the activated cell input, with the cell status gradients to generate one or more cell input gradients. For example, the cell input gradients may be represented as $\delta_c^t=b_I^t g'(a_c^t)\in_s^t$, in which $b_I^t$ represents the activated input gate value of the current computation period, $g'(a_c^t)$ represents the cell input activated by the derivative of the activation function, and $\in_s^t$ represents the cell status gradients.

In calculating the forget gate gradients, the activator 608 may be configured to activate a dormant forget gate value to generate an activated forget gate value. The multipliers 612 may be configured to multiply the activated forget gate value with the forget gate multiplication result to generate one or more forget gate gradients. For example, the forget gate gradients may be represented as $\delta_\varnothing^t=f'(a_\varnothing^t)\Sigma_{c=1}^{C}s_c^{t-1}\in_s^t$ in which $f'(a_\varnothing^t)$ represents a dormant forget gate value activated by the derivative of the activation function, $s_c^{t-1}$ represents the cell status vector of the previous computation period, and $\in_s^t$ represents the cell status gradients.

In calculating the input gate gradients, the activator 608 may be configured to activate a current cell status of the current computation period to generate an activated current cell status and activate the dormant input gate value to generate an activated input gate value. The multipliers 612 may be configured to multiply the activated input gate value with the input gate multiplication result to generate one or more input gate gradients. For example, the input gate gradients may be represented as $\delta_I^t=f'(a_I^t)\Sigma_{c=1}^{C}g(s_c^t)\in_s^t$ in which $f'(a_I^t)$ represents a dormant input gate value activated by the derivative of the activation function, $g(s_c^t)$ represents the activated current cell status, and $\in_s^t$ represents the cell status gradients.

Figure 7:
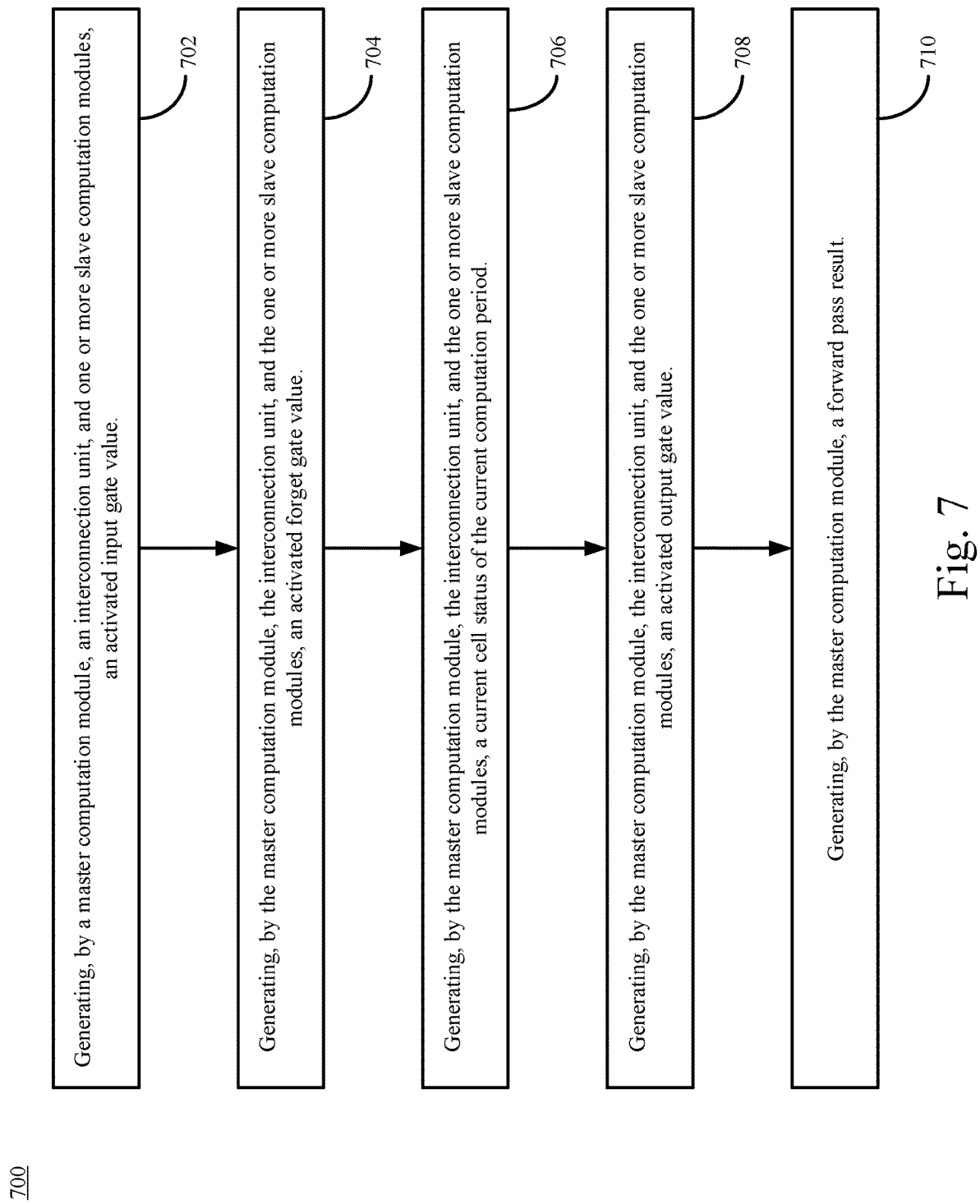
FIG. 7 illustrates a flow chart of an example method for forward pass in an RNN that includes LSTM blocks.

FIG. 7 illustrates a flow chart of an example method 700 for forward pass in an RNN that includes LSTM blocks. The example method 700 may be performed by one or more components as described in FIGS. 3-6.

At block 702, the example method 700 may include generating, by a master computation module, an interconnection unit, and one or more slave computation modules, an activated input gate value. For example, the slave computation modules 314 may be configured to calculate a first input gate partial sum, a second input gate partial sum, and a third input gate partial sum. In more detail, the slave computation modules 314 may be configured to multiply a first portion of a first stored weight vector with one or more input data to generate the first input gate partial sum. The second input gate partial sum may be calculated by the slave computation modules 314 by multiplying a second portion of a first store weight vector with one or more hidden layer input data of a previous computation period to generate the second input gate partial sum. Further, the slave computation modules 314 may be configured to multiply a third portion of a first stored weight vector with a cell status vector of a previous computation period to generate the third input gate partial sum.

The first input gate partial sum, the second input gate partial sum, and the third input gate partial sum may be transmitted by the slave computation modules 314 to the interconnection unit 308 and further be added by the interconnection unit 308 to generate a dormant input gate value. For example, the dormant input gate value of the current computation period may be represented as $a_I^t = \sum_{i=1}^{I} w_{il} s_i^t + \sum_{h=1}^{H} w_{hl} b_h^{t-1} + \sum_{c=1}^{C} w_{cl} s_c^{t-1}$, in which $\sum_{i=1}^{I} w_{il} s_i^t$ represents the first input gate partial sum, $\sum_{h=1}^{H} w_{hl} b_h^{t-1}$ represents the second input gate partial sum, $\sum_{c=1}^{C} w_{cl} s_c^{t-1}$ represents the third input gate partial sum, l represents an index in a vector of a length I, $x_i^t$ represents the input data received at the net input 202 in the current computation period, $b_h^{t-1}$ represents one or more hidden layer input data of the previous computation period (e.g., from hidden node 114B to hidden layer 114C), and $s_c^{t-1}$ represents the cell status vector of the previous computation period. In some examples, each of the slave computation modules 314 may be configured to store a weight vector and $w_{il}$, and $w_{hl}$, $w_{cl}$ may respectively refer to different portions of the stored weight vector.

The dormant input gate value $a_I^t$ may then be transmitted from the interconnection unit 308 to the master computation module 312. The master computation module 312 may be configured to activate the dormant input gate value $a_I^t$ to generate the activated input gate value. The activated input gate value may be represented as $b_I^t = f(a_I^t)$, in which f( ) may refer to an activation function stored in the master computation module 312. The activation function may be one of sigmoid, relu, softmax, or tanh function.

At block 704, the example method 700 may include generating, by the master computation module, the interconnection unit, and the one or more slave computation modules, an activated forget gate value. For example, the slave computation modules 314 may be configured to calculate a first forget gate partial sum, a second forget gate partial sum, and a third forget gate partial sum. In more detail, the slave computation modules 314 may be configured to multiply a first portion of a second stored weight vector with one or more input data to generate the first forget gate partial sum. Further, the slave computation modules 314 may be configured to multiply a second portion of a second stored weight vector with one or more hidden layer input data of a previous computation period to generate the second forget gate partial sum. In addition, the slave computation modules 314 may be configured to multiply a third portion of a second stored weight vector with a cell status vector of a previous computation period to generate the third forget gate partial sum.

The first forget gate partial sum, the second forget gate partial sum, and the third forget gate partial sum may be similarly transmitted to the interconnection unit 308 and added by the interconnection unit 308 into a dormant forget gate value of the current computation period. For example, the dormant forget gate value may be represented as $a_{\emptyset}^t = \sum_{i=1}^{I} w_{i\emptyset} x_i^t + \sum_{h=1}^{H} w_{h\emptyset} b_h^{t-1} + \sum_{c=1}^{C} w_{c\emptyset} s_c^{t-1}$, in which $\sum_{i=1}^{I} w_{i\emptyset} x_i^t$ represents the first forget gate partial sum, $\sum_{h=1}^{H} w_{h\emptyset} b_h^{t-1}$ represents the second forget gate partial sum, $\sum_{c=1}^{C} w_{c\emptyset} s_c^{t-1}$ represents the third forget gate partial sum, $w_{i\emptyset}$, $w_{h\emptyset}$, $w_{c\emptyset}$ respectively refers to different portions of the stored weight vector, Ø refers to another index in a vector of a length I. Similarly, $x_i^t$ represents the input data received at the net input 202 in the current computation period, $b_h^{t-1}$ represents one or more hidden layer input data of the previous computation period (e.g., from hidden node 114B to hidden layer 114C), and $s_c^{t-1}$ represents the cell status vector of the previous computation period.

The dormant forget gate value may be transmitted by the interconnection unit 308 to the master computation module 312. The master computation module 312 may be configured to activate the dormant forget gate value with an activation function to generate an activated forget gate value that may be represented as $b_{\emptyset}^t = f(a_{\emptyset}^t)$, in which f( ) may refer to an activation function stored in the master computation module 312. The activation function may be different from the activation function applied in generate the activated input gate value.

At block 706, the example method 700 may include generating, by the master computation module, the interconnection unit, and the one or more slave computation modules, a current cell status of the current computation period. For example, the slave computation modules 114 may be configured to calculate a first cell status partial sum and a second cell status partial sum. In more detail, the slave computation modules 114 may be configured to multiply a first portion of a third stored weight vector with one or more input data to generate the first cell status partial sum. In addition, the slave computation modules 114 may be configured to multiply a second portion of a third stored weight vector with one or more hidden layer input data of a previous computation period to generate the second cell status partial sum.

The first cell status partial sum and the second cell status partial sum may be transmitted to the interconnection unit 308 and added by the interconnection unit 308 to generate a cell input of the current computation period. For example, the cell input of a current computation period may be represented as $a_c^t = \sum_{i=1}^{I} w_{ic} x_i^t + \sum_{h=1}^{H} w_{hc} b_h^{t-1}$, $\sum_{i=1}^{I} w_{ic} x_i^{t-1}$ represents the first cell status partial sum and $\sum_{h=1}^{H} w_{hc} b_h^{t-1}$ represents the second cell status partial sum. Similarly, $w_{ic}$ and $w_{hc}$ may respectively refer to different portions of the stored weight vector. $x_i^t$ represents the input data received at the net input 202 in the current computation period, $b_h^{t-1}$ represents one or more hidden layer input data of the previous computation period.

The cell input of the current computation period may be transmitted to the master computation module 312. The master computation module 312 may be configured to generate a current cell status of the current computation period based on the activated forget gate value, the activated input gate value, and the cell input of the current computation period. For example, the current cell status may be represented as $s_c^t = b_{\emptyset}^t s_c^{t-1} + b_I^t g(a_c^t)$, in which $b_{\emptyset}^t$ represents the activated forget gate value, $s_c^{t-1}$ represents the cell status vector of the previous computation period, $b_I^t$ represents the activated input gate value, $g(a_c^t)$ represents an activated cell input. The activated cell input may be generated by the master computation module 312 by applying an activation function to the cell input. The activation function may be different from the activation function applied in generate the activated input gate value.

At block 708, the example method 700 may include generating, by the master computation module, the interconnection unit, and the one or more slave computation modules, an activated output gate value. For example, the slave computation modules 314 may be configured to calculate a first output gate partial sum, a second output gate partial sum, and a third output gate partial sum. In more detail, the slave computation modules 314 may be configured to multiply a portion of the weight vector with the input data received at the net input 202 to generate the first output gate partial sum. Further, the slave computation modules 314 may be configured to multiply another portion of the weight vector with the one or more hidden layer input data of the previous computation period. Further still, the slave computation modules 314 may be configured to multiply yet another portion of the weight vector with the current cell status.

The first output gate partial sum, the second output gate partial sum, and the third output gate partial sum may be transmitted to the interconnection unit 108 and added by the interconnection unit 108 to generate a dormant output gate value. For example, the dormant output gate value may be represented as $a_\omega{}^t = \Sigma_{i=1}^I w_{i\omega} x_i{}^t + \Sigma_{h=1}^H w_{h\omega} b_h{}^{t-1} + \Sigma_{c=1}^C w_{c\omega} s_c{}^t$, in which $\Sigma_{i=1}^I w_{i\omega} x_i{}^t$ represents the first output gate partial sum, $\Sigma_{h=1}^H w_{h\omega} b_h{}^{t-1}$ represents the second output gate partial sum, $\Sigma_{c=1}^C w_{c\omega} s_c{}^t$ represents the third output gate partial sum. Similarl, $w_{i\omega}$, $w_{h\omega}$, and $w_{c\omega}$ may respectively refer to different portions of the stored weight vector; $x_i{}^t$, represents the input data received at the net input 202 in the current computation period, $b_h{}^{t-1}$ represents one or more hidden layer input data of the previous computation period.

The dormant output gate value may be transmitted to the master computation module 312. The master computation module 312 may be configured to activate the dormant output gate value to generate an activated output gate value. The activated output gate value may be represented as $b_\omega{}^t = f(a_\omega{}^t)$, in which $f(\ )$ may refer to an activation function stored in the master computation module 312.

At block 710, the example method 700 may generating, by the master computation module, a forward pass result. For example, master computation module 312 may be configured to activate the current cell status of the current computation period to generate an activated current cell status and multiply the activated current cell status with the activated output gate value to generate a forward pass result. For example, the forward pass result may be represented as $b_c{}^t = b_\omega{}^t h(s_c{}^t)$, in which $b_\omega{}^t$ represents the activated output gate value and $h(s_c{}^t)$ represents the activated current cell status.

Figure 8:
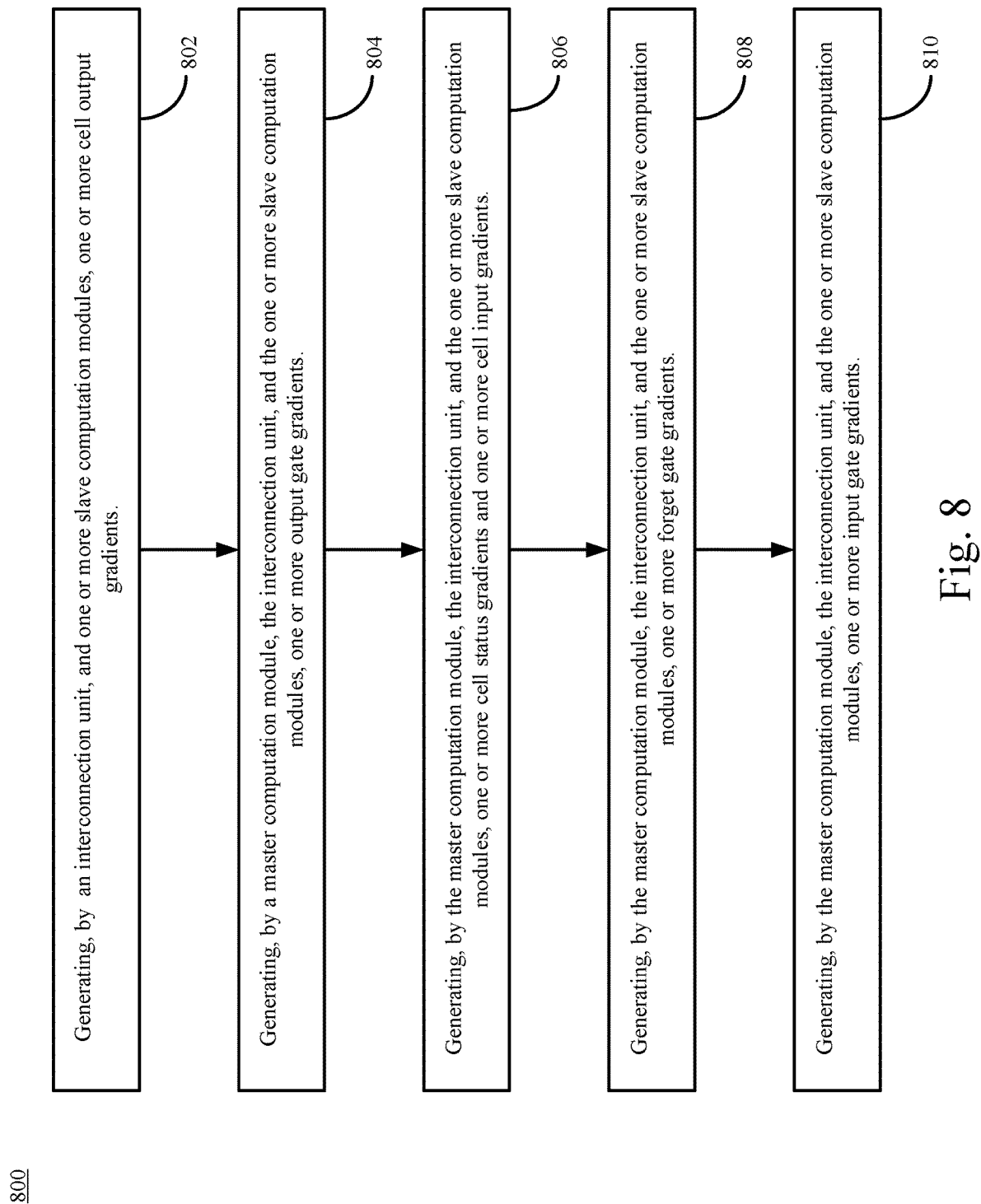
FIG. 8 illustrates a flow chart of an example method for backward pass in an RNN that includes LSTM blocks.

FIG. 8 illustrates a flow chart of an example method for backward pass in an RNN that includes LSTM blocks. The example method 800 may be performed by one or more components as described in FIGS. 3-6.

At block 802, the example method 800 may include generating, by an interconnection unit, and one or more slave computation modules, one or more cell output gradients. For example, the slave computation modules 314 may be configured to calculate a first cell output partial sum and a second cell output partial sum. In more detail, the slave computation modules 314 may be configured to multiply a portion of the stored weight vector with an output difference of the current computation period to generate the first cell output partial sum. The output difference of the current computation period may refer to a difference between the forward pass result and an estimated forward pass result. Further, the slave computation modules 314 may be configured to multiply another portion of the stored weight vector with an output difference of a next computation period. The first cell output partial sum and the second cell output partial sum may be transmitted to the interconnection unit 308 and added by the interconnection 308 into the cell output gradients. For example, the cell output gradients may be represented as $\in_c{}^t = \Sigma_{k=1}^K w_{ck} \delta_k{}^t + \Sigma_{g=1}^G w_{cg} \delta_g{}^{t+1}$, in which $\Sigma_{k=1}^K w_{ck} \delta_k{}^t$ represents the first cell output partial sum, $\Sigma_{g=1}^G w_{cg} \delta_g{}^{t+1}$ represents the second cell output partial sum, $w_{ck}$ and $w_{cg}$ respectively represents different portions of the stored weight vector, $\delta_k{}^t$ represents the output difference of the current computation period, and $\delta_g{}^{t+1}$ represents the output difference of the next computation period.

At block 804, the example method 800 may include generating, by the master computation module, the interconnection unit, and the one or more slave computation modules, one or more output gate gradients. For example, the slave computation modules 314 may be configured to multiply the cell output gradients with activated current cell status to generate a cell output multiplication result. The master computation module 312 may be configured to activate a dormant output gate value with a derivative of an activation function to generate an activated output gate value and, further, multiply the activated output gate value with the cell output multiplication result to generate the output gate gradients. For example, the output gate gradients may be represented as $\delta_\omega{}^t = f'(a_\omega{}^t) \Sigma_{c=1}^C h(s_c{}^t) \in_c{}^t$, in which $\in_c{}^t$ represents the cell output gradients, $h(s_c{}^t)$ represents the activated current cell status, $f'(a_\omega{}^t)$ represents the activated output gate value, and $f'(\ )$ represents the derivative of an activation function.

At block 806, the example method 800 may include generating, by the master computation module, the interconnection unit, and the one or more slave computation modules, one or more cell status gradients and one or more cell input gradients. For example, the slave computation modules 314 may be configured to calculate a first cell status partial sum, a second cell status partial sum, a third cell status partial sum, a fourth cell status partial sum, and a fifth cell status partial sum. The first cell status partial sum, the second cell status partial sum, the third cell status partial sum, the fourth cell status partial sum, and the fifth cell status partial sum may be transmitted to the interconnection unit 308 and added by the interconnection unit 308 into one or more cell status gradients. For example, the cell status gradients may be represented as $\in_s{}^t = b_\omega{}^t h'(s_c{}^t) \in_c{}^t + b_\varnothing{}^{t+1} \in_s{}^{t+1} + w_{cI} \delta_I{}^{t+1} + w_{c\varnothing} \delta_\varnothing{}^{t+1} + w_{c\omega} \delta_\omega{}^{t+1}$, in which $b_\omega{}^t$ represents the activated output gate value, $h'(s_c{}^t)$ represents current cell status activated by a derivative of the activation function, $\in_c{}^t$ represents the cell output gradients, $b_\varnothing{}^{t+1}$ represents an activated forget gate value of a next computation period, $\in_s{}^{t+1}$ represents cell status gradients of the next computation period, $w_{cI}$, $w_{c\varnothing}$ and $w_{c\omega}$ respectively represents different portions of the stored weight vector, $\delta_I{}^{t+1}$ represents input gate gradients of the next computation period, $\delta_\varnothing{}^{t+1}$ represents the forget gate gradients of the next computation period, and $\delta_\omega{}^{t+1}$ represents the output gate gradients of the next computation period.

In calculating the cell input gradients, the master computation module 312 may be configured to activate a cell input of a current computation period to generate one or more activated cell input and multiply an activated input gate value, the activated cell input, with the cell status gradients to generate one or more cell input gradients. For example, the cell input gradients may be represented as $\delta_c{}^t = b_I{}^t g'(a_c{}^t) \in_s{}^t$, in which $b_I{}^t$ represents the activated input gate value of the current computation period, $g'(a_c{}^t)$ represents the cell input activated by the derivative of the activation function, and $\in_s{}^t$ represents the cell status gradients.

At block 808, the example method 800 may include generating, by the master computation module, the interconnection unit, and the one or more slave computation modules, one or more forget gate gradients. For example, the slave computation modules 314 may be configured to multiply the cell status gradients with a previous cell status of a previous computation period to generate a forget gate multiplication result. The master computation module 312 may be configured to activate a dormant forget gate value to generate an activated forget gate value and multiply the activated forget gate value with the forget gate multiplication result to generate one or more forget gate gradients. For example, the forget gate gradients may be represented as $\delta_\varnothing{}^t = f'(a_\varnothing{}^t)\Sigma_{c=1}{}^C s_c{}^{t-1} \in_s{}^t$, in which $f'(a_\varnothing{}^t)$ represents a dormant forget gate value activated by the derivative of the activation function, $s_c{}^{t-1}$ represents the cell status vector of the previous computation period, and $\in_s{}^t$ represents the cell status gradients.

At block 810, the example method 800 may include generating, by the master computation module, the interconnection unit, and the one or more slave computation modules, one or more input gate gradients. For example, the master computation module 312 may be configured to activate a current cell status of the current computation period to generate an activated current cell status and activate the dormant input gate value to generate an activated input gate value. The slave computation modules 314 may be configured to multiply the activated current cell status with the one or more cell status gradients to generate an input gate multiplication result. The master computation module 312 may be further configured to multiply the activated input gate value with the input gate multiplication result to generate one or more input gate gradients. For example, the input gate gradients may be represented as $\delta_I{}^t = f'(a_I{}^t)\Sigma_{c=1}{}^C g(s_c{}^t) \in_s{}^t$, in which $f'(a_I{}^t)$ represents a dormant input gate value activated by the derivative of the activation function, $g(s_c{}^t)$ represents the activated current cell status, and $\in_s{}^t$ represents the cell status gradients.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for forward pass in a recurrent neural network (RNN) network, comprising:
   one or more slave computation modules configured to calculate a first input gate partial sum, a second input gate partial sum, and a third input gate partial sum;
   an interconnection unit configured to add the first input gate partial sum, the second input gate partial sum, and the third input gate partial sum to generate a dormant input gate value; and
   a master computation module connected to the one or more slave computation modules via the interconnection unit, wherein the master computation module configured to activate the dormmate input gate value to generate an activated input gate value.

2. The apparatus of claim 1, wherein the one or more slave computation modules are further configured to multiply a first portion of a first stored weight vector with one or more input data to generate the first input gate partial sum.

3. The apparatus of claim 1, wherein the one or more slave computation modules are further configured to multiply a second portion of a first store weight vector with one or more hidden layer input data of a previous computation period to generate the second input gate partial sum.

4. The apparatus of claim 1, wherein the one or more slave computation modules are further configured to multiply a third portion of a first stored weight vector with a cell status vector of a previous computation period to generate the third input gate partial sum.

5. The apparatus of claim 1,
   wherein the slave computation modules are further configured to calculate a first forget gate partial sum, a second forget gate partial sum, and a third forget gate partial sum;
   wherein the interconnection unit is further configured to add the first forget gate partial sum, the second forget gate partial sum, and the third forget gate partial sum to generate a dormant forget gate value; and
   wherein the master computation module is further configured to activate the dormant forget gate value to generate an activated forget gate value.

6. The apparatus of claim 5, wherein the one or more slave computation modules are further configured to multiply a first portion of a second stored weight vector with one or more input data to generate the first forget gate partial sum.

7. The apparatus of claim 5, wherein the one or more slave computation modules are further configured to multiply a second portion of a second stored weight vector with one or more hidden layer input data of a previous computation period to generate the second forget gate partial sum.

8. The apparatus of claim 5, wherein the one or more slave computation modules are further configured to multiply a third portion of a second stored weight vector with a cell status vector of a previous computation period to generate the third forget gate partial sum.

9. The apparatus of claim 5,
wherein the one or more slave computation modules are further configured to calculate a first cell status partial sum and a second cell status partial sum;
wherein the interconnection unit is further configured to add the fist cell status partial sum and the second cell status partial sum to generate a cell input of a current computation period; and
wherein the master computation module is further configured to generate a current cell status of the current computation period based on the activated forget gate value, the activated input gate value, and the cell input of the current computation period.

10. The apparatus of claim 9, wherein the one or more slave computation modules are further configured to multiply a first portion of a third stored weight vector with one or more input data to generate the first cell status partial sum.

11. The apparatus of claim 9, wherein the one or more slave computation modules are further configured to multiply a second portion of a third stored weight vector with one or more hidden layer input data of a previous computation period to generate the second cell status partial sum.

12. The apparatus of claim 9, wherein the master computation module is further configured to:
multiply the activated forget gate value with a previous cell status of a previous computation period to generate a first cell multiplication result,
activate the cell input of the current computation period to generate an activated cell input,
multiply the activated cell input with the activated input gate value to generate a second cell multiplication result, and
add the first cell multiplication result to the second cell multiplication result to generate the current cell status of the current computation period.

13. The apparatus of claim 9,
wherein the one or more slave computation modules are configured to calculate a first output gate partial sum, a second output gate partial sum, and a third output gate partial sum;
wherein the interconnection unit is configured to add the first output gate partial sum, the second output gate partial sum, and the third output gate partial sum to generate a dormant output gate value; and
wherein the master computation module is configured to activate the dormant output gate value to generate an activated output gate value.

14. The apparatus of claim 13, wherein the master computation module is further configured to:
activate the current cell status of the current computation period to generate an activated current cell status; and
multiply the activated current cell status with the activated output gate value to generate a forward pass result.

15. A method for forward pass in a recurrent neural network (RNN) network, comprising:

calculating, by one or more slave computation modules, a first input gate partial sum, a second input gate partial sum, and a third input gate partial sum;
adding, by an interconnection unit, the first input gate partial sum, the second input gate partial sum, and the third input gate partial sum to generate a dormant input gate value; and
activating, by a master computation module connected to the one or more slave computation modules via the interconnection unit, the dormmate input gate value to generate an activated input gate value.

16. The method of claim 15, wherein the calculating of the first input gate partial sum includes multiplying, by the one or more slave computation modules, a first portion of a first stored weight vector with one or more input data to generate the first input gate partial sum.

17. The method of claim 15, wherein the calculating of the second input gate partial sum includes multiplying, by the one or more slave computation modules, a second portion of a first store weight vector with one or more hidden layer input data of a previous computation period to generate the second input gate partial sum.

18. The method of claim 15, wherein the calculating of the third input gate partial sum includes multiplying, by the one or more slave computation modules, a third portion of a first stored weight vector with a cell status vector of a previous computation period to generate the third input gate partial sum.

19. The method of claim 15, further comprising:
calculating, by slave computation modules, a first forget gate partial sum, a second forget gate partial sum, and a third forget gate partial sum;
adding, by the interconnection unit, the first forget gate partial sum, the second forget gate partial sum, and the third forget gate partial sum to generate a dormant forget gate value; and
activating, by the master computation module, the dormant forget gate value to generate an activated forget gate value.

20. The method of claim 19, wherein the calculating of the first forget gate partial sum includes multiplying, by the one or more slave computation modules, a first portion of a second stored weight vector with one or more input data to generate the first forget gate partial sum.

21. The method of claim 19, wherein the calculating of the second forget gate partial sum includes multiplying, by the one or more slave computation modules, a second portion of a second stored weight vector with one or more hidden layer input data of a previous computation period to generate the second forget gate partial sum.

22. The method of claim 19, wherein the calculating of the third forget gate partial sum includes multiplying, by the one or more slave computation modules, a third portion of a second stored weight vector with a cell status vector of a previous computation period to generate the third forget gate partial sum.

23. The method of claim 19, further comprising:
calculating, by the one or more slave computation modules, a first cell status partial sum and a second cell status partial sum;
adding, by the interconnection unit, the fist cell status partial sum and the second cell status partial sum to generate a cell input of a current computation period; and
generating, by the master computation module, a current cell status of the current computation period based on the activated forget gate value, the activated input gate value, and the cell input of the current computation period.

24. The method of claim 19, wherein the calculating of the first cell status partial sum includes multiplying, by the one or more slave computation modules, a first portion of a third stored weight vector with one or more input data to generate the first cell status partial sum.

25. The method of claim 19, wherein the calculating the second cell status partial sum includes multiplying, by the one or more slave computation modules, a second portion of a third stored weight vector with one or more hidden layer input data of a previous computation period to generate the second cell status partial sum.

26. The method of claim 19, wherein the generating of the current cell status includes multiplying, by the master computation module, the activated forget gate value with a previous cell status of a previous computation period to generate a first cell multiplication result, activating, by the master computation module, the cell input of the current computation period to generate an activated cell input, multiplying, by the master computation module, the activated cell input with the activated input gate value to generate a second cell multiplication result, and adding, by the master computation module, the first cell multiplication result to the second cell multiplication result to generate the current cell status of the current computation period.

27. The method of claim 19, further comprising:

calculating, by the one or more slave computation modules, a first output gate partial sum, a second output gate partial sum, and a third output gate partial sum;

adding, by the interconnection unit, the first output gate partial sum, the second output gate partial sum, and the third output gate partial sum to generate a dormant output gate value; and activating, by the master computation module, the dormant output gate value to generate an activated output gate value.

28. The method of claim 27, further comprising:

activating, by the master computation module, the current cell status of the current computation period to generate an activated current cell status; and multiplying, by the master computation module, the activated current cell status with the activated output gate value to generate a forward pass result.

\* \* \* \* \*